UNITED STATES PATENT OFFICE.

EUGENE VON VARGYAS, OF WASHINGTON, DISTRICT OF COLUMBIA.

RUBBER COMPOUND.

1,202,340.      Specification of Letters Patent.      Patented Oct. 24, 1916.

No Drawing.      Application filed August 10, 1916. Serial No. 114,244.

*To all whom it may concern:*

Be it known that I, EUGENE VON VARGYAS, a subject of the King of Hungary, residing at Washington, in the District of Columbia, have invented certain new and useful Improvements in Rubber Compounds, of which the following is a specification.

This invention relates to rubber compounds.

The object of the invention is to provide a compound of the character named, which, while possessing all of the resiliency of natural rubber, shall present greater wear resisting qualities; shall be capable, without deterioration, of withstanding extremes of heat and cold; shall be practically immune from rotting or softening caused by surface contact with oleaginous substances; and which shall present the maximum resistance to puncture.

With the above and other objects in view, as will appear as the nature of the invention is better understood, the same consists in the novel rubber compound hereinafter described and claimed.

In carrying my invention into effect, and as one example of the compound that possesses all of the advantageous qualities above outlined I take 12 ounces of rubber in its uncured state, from $\frac{3}{4}$ to $2\frac{1}{5}$ ounces of dry cork flour, from $1\frac{1}{5}$ to $3\frac{1}{10}$ ounces of raw hide, either in granular, fibrous, or gelatinous form, preferably the latter, and from $10\frac{1}{5}$ to $11\frac{3}{4}$ ounces of mineral slag, preferably iron slag.

The rubber is reduced to the proper consistency in any suitable manner as by the use of a solvent, after which the cork flour, raw hide and iron slag are added and thoroughly mixed with the rubber. The compound is then placed in a mold of any desired shape and may be vulcanized in the ordinary manner.

By mineral slag is meant the residue from iron furnaces or the like, which is of granular form with all deleterious substances, such as sulfur and the like removed. Both the slag and cork flour are reduced to a very fine powder, although the degree of granulation may vary between certain limits.

The cork flour constitutes a filler and the iron slag a binder for the rubber and cork, while the raw hide forms an effective substitute for rubber, and by assimilation with the latter reduces to the minimum the quantity of rubber to be used, thus materially cheapening the cost of the product without in the least detracting from its desired qualities.

What is claimed is:

1. As a new article of manufacture, a rubber compound consisting of rubber, dry cork flour, iron slag and gelatinous raw hide, the quantity of rubber in the compound by weight being less than the combined weights of the cork flour, iron slag and raw hide.

2. As a new article of manufacture, a rubber compound consisting of twelve ounces of rubber, three-fourths to two and one-fifth ounces of dry cork flour, ten and one-fifth to eleven and three-fourths of iron slag and one and one-fifth to three and one-tenth ounces of gelatinous raw hide.

In testimony whereof I affix my signature in presence of two witnesses.

EUGENE VON VARGYAS.

Witnesses:
R. M. ELLIOTT,
STEPHAN KUWBASMELS.